(12) United States Patent
Ozog et al.

(10) Patent No.: US 7,657,747 B2
(45) Date of Patent: Feb. 2, 2010

(54) SYSTEM AND METHOD FOR SPECIFYING SECURITY, PRIVACY, AND ACCESS CONTROL TO INFORMATION USED BY OTHERS

(75) Inventors: Francois Frederic Ozog, Adainville (FR); Etienne Coulon, Claix (FR)

(73) Assignee: Link Us All, LLC, Reno, NV (US)

( * ) Notice: Subject to any disclaimer, the term of this patent is extended or adjusted under 35 U.S.C. 154(b) by 530 days.

(21) Appl. No.: 10/173,204

(22) Filed: Jun. 14, 2002

(65) Prior Publication Data

US 2003/0033528 A1 Feb. 13, 2003

Related U.S. Application Data

(60) Provisional application No. 60/298,421, filed on Jun. 15, 2001.

(51) Int. Cl.
*H04L 9/00* (2006.01)
*G06F 7/04* (2006.01)

(52) U.S. Cl. .................. 713/170; 713/156; 713/175; 713/180; 726/10; 726/27

(58) Field of Classification Search .......... 713/170, 713/156, 182, 155, 180, 175, 165, 173, 176; 380/201; 726/2, 3, 4, 10, 17, 21, 26–30; 399/366; 715/741
See application file for complete search history.

(56) References Cited

U.S. PATENT DOCUMENTS

| 5,390,297 | A  | * | 2/1995  | Barber et al. | 726/29   |
|-----------|----|---|---------|---------------|----------|
| 5,978,484 | A  | * | 11/1999 | Apperson et al. | 705/54 |
| 6,226,618 | B1 | * | 5/2001  | Downs et al.  | 705/1    |
| 6,535,978 | B1 | * | 3/2003  | Padgett et al.| 713/156  |
| 6,587,945 | B1 | * | 7/2003  | Pasieka       | 713/176  |
| 6,601,172 | B1 | * | 7/2003  | Epstein       | 713/178  |
| 2001/0053223 | A1 | * | 12/2001 | Ishibashi et al. | 380/231 |
| 2002/0015185 | A1 | * | 2/2002  | Onishi et al. | 358/1.16 |
| 2003/0195854 | A1 | * | 10/2003 | Wittkotter    | 705/51   |

(Continued)

FOREIGN PATENT DOCUMENTS

EP 0 828 208 A2 1/1997

(Continued)

OTHER PUBLICATIONS

Ashley P., Vandenwauer M., Claessens J.: "Using Sesame to Secure Web Based Applications on an Internet" Sep. 20, 1999, Information Security Research Center Australia, XP-002260869, pp. 303-317.*

(Continued)

*Primary Examiner*—Eleni A Shiferaw
(74) *Attorney, Agent, or Firm*—Buchanan Ingersoll & Rooney PC

(57) ABSTRACT

A grantor issues a trustable electronic document for the benefit of a requestor. The requestor may be able to get the benefits specified by the electronic document through access controls located at the service or information origin. A request digitally signed by a requestor is received. The digitally signed request contains the electronic document digitally signed by the grantor. The electronic document also contains a grantor certified reference, a requestor certified reference, and access control rules for the requestor. The request is validated using the requestor certified reference and the access control rules for the requestor.

44 Claims, 10 Drawing Sheets

U.S. PATENT DOCUMENTS

2005/0005118 A1* 1/2005 Wheeler et al. ............. 713/170

OTHER PUBLICATIONS

Ashley, Paul, "Using Sesame to Secure WEB Based Applications on an Intranet", Sep. 20-21, 1999, Secure Information Networks, Proceedings of the IFIP TC6/TC11 Joint.Working Conference on Communications and Multimedia Security, pp. 303-317.

Damiani et al., "Design and Implementation of an Access Control Processor for XML Documents", 2000, Computer Networks 33, pp. 59-75.

Herzberg et al., "Access Control Meets Public Key Infrastructure, Or: Assigning Roles to Strangers", 2000, IEEE, pp. 2-14.

Linn et al., "Attribute Certification: An Enabling Technology for Delegation and Role-Based Controls in Distributed Environments", 1999, RBAC, Fairfax, VA, pp. 121-130.

Zhan et al., "On the Security of HY-key Authentication Scheme", 1999, Computer Communications 22, pp. 739-741.

International Search Report (Partial) dated Dec. 3, 2003, PCT/US02. 19100, from the International Searching Authority of the Patent Cooperation Treaty.

Brezak, J., "Utilizing the Windows 2000 Authorization Data in Kerberos Tickets for Access Control to Resources." Microsoft Corporation, Feb. 2002, http://msdn.microsoft.com/en-us/library/aa302203(printer).aspx, pp. 1-7.

Microsoft Tech Net, "Authentication for Administrative Authority", 2000, http://www.microsoft.com/technet/Security/bestpract/authent.mspx?pf=true, pp. 1-18.

* cited by examiner

SYSTEM AND METHOD FOR SPECIFYING SECURITY, PRIVACY, AND ACCESS CONTROL TO INFORMATION USED BY OTHERS

CROSS-REFERENCES

The present application claims the benefit of U.S. Provisional Patent Application Ser. No. 60/298,421, filed Jun. 15, 2001 in the name of inventors Francois Ozog, and Etienne Coulon, commonly assigned herewith.

FIELD OF THE INVENTION

The present invention relates to the field of computer software systems. More particularly, the present invention relates to system and method for access control.

BACKGROUND OF THE INVENTION

Multiple technologies exist to verify and validate the identity of a requestor. Identity can be verified by using the combination of a username and a secret password or by using more advanced technologies like token cards, smart cards, Public Key Infrastructure Certificates. One shortcoming of all the former methods is that they all require that the identity of the requestor be known by the entity prior to the request is made. New technologies that are still work in progress like "Attribute Certificate" may help to overcome some of the limitations of its ancestors but still, does not allow to take into account the full context of the request like the location or the requesting method or device. But to date no technology allows the idea of a proxy in which one entity is able to delegate part of its rights to a second entity so that it could conduct actions on behalf on the first entity.

Those limitations become a major hurdle in a number of circumstances:

An Internet user cannot securely delegate part of its authority to a financial portal that would aggregate financial information from multiple banks, financial institutions, or financial information sources. Today, people have to share their identity information with companies acting as aggregators. As there are no ways for a bank to differentiate between a customer access and an aggregator access, the identity protection relies on the good behavior and internal security of the aggregator.

Corporations let their partner's employees access information in their extranet, but they lack a mechanism that immediately terminates this access when those employees' situation changes, such as leaving the company or change in the employee's role to one which does not warrant access to the information.

Telecommunication providers, especially those in the wireless sector, have great difficulties offering differentiated services to corporations for a reason very similar to the above management problem of corporate extranet. The problem is even more complex due to the fact that many external companies provide various pieces of information. Differentiated services include, but are not limited to, preferred services, contract management, delegated management.

To further refine the needs of wireless Data Service providers, Data Services Roaming is required. Data Service Roaming functions much like the voice roaming is available today, but goes beyond as it needs to handle a minimum of four parameter sets to grant/deny access to the service: subscriber, home operator, visited operator, service/content provider.

Lastly, corporations have recognized the need for enhanced security policies. For example, some corporations might want to prohibit access to critical data in un-trusted computers, which could be located in places such as airport business lounges. Authorization is, therefore, not only a function of identity, but also a function of the context of the access. Context definition covers without limitation: geographical location, time, device type, and device trust.

Accordingly, a need exists for an integration of technologies into a framework that would solve all of the preceding problems.

BRIEF DESCRIPTION OF THE INVENTION

A grantor issues a trustable electronic document for the benefit of a requestor. The requestor may be able to get the benefits specified by the electronic document through access controls located at the service or information origin. A request digitally signed by a requestor is received. The digitally signed request contains the electronic document digitally signed by the grantor. The electronic document also contains a grantor certified reference, a requestor certified reference, and access control rules for the requestor. The request is validated using the requestor certified reference and the access control rules for the requestor.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
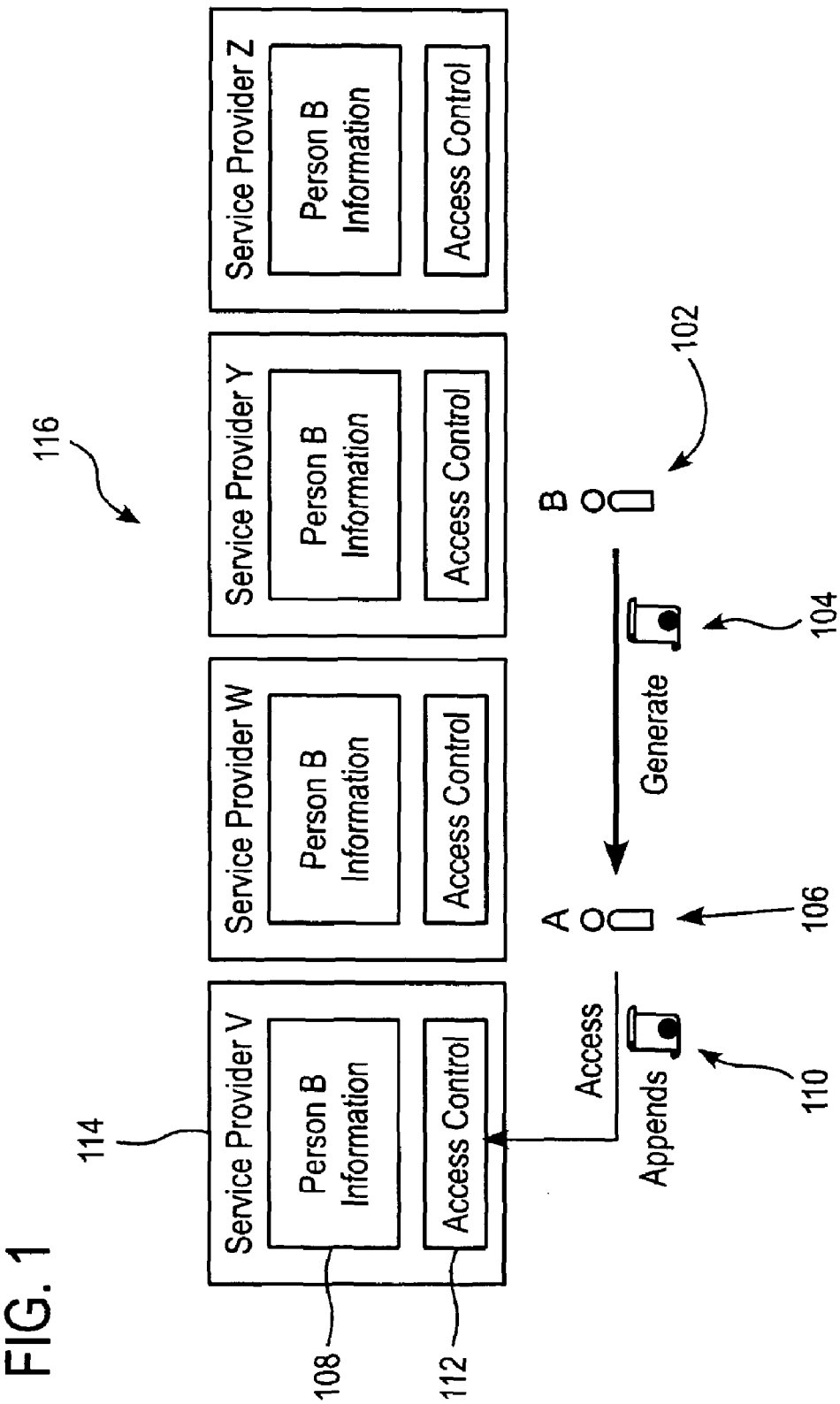
FIG. 1 is a block diagram illustrating an infrastructure for validating access to information in accordance with one specific embodiment of the present invention.

Embodiments of the present invention are described herein in the context of a system and method for specifying security, privacy, and access control to information used by others. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

An electronic document issued by one party, the issuer, to another party, the beneficiary, allows the beneficiary to obtain services or information from a third party on behalf of the issuer. The electronic document may contain a reference of several identities, a reference of credential information and general attributes. These features may or may not be certified by other third parties. The beneficiary can get the benefits specified by the electronic document through access controls located at the service or information origin.

This invention complements other technologies like conventional authentication; single sign-on, S2ML, SAML, PKI in general and Attribute Certificate in particular. This invention can be seen as a policy based identity substitution mechanism that extends identity propagation mechanisms described in other inventions through proxy and/or temporary credentials.

The following paragraphs present details of the electronic document, also referred as the Mandate, and the access control, also referred as the Gate, while giving examples of their specific uses that lead to the resolution of the problems exposed in the background section.

The present invention is described in terms of an XML document, but it should be understood that the techniques and procedures disclosed could be applied to any other document format. No facet of the present invention is limited to specifications based on XML document format.

FIG. 1 illustrates an example of an issuer generating a Mandate for use by a beneficiary. The issuer B 102 generates a Mandate 104 for the beneficiary A 106. Whenever beneficiary A 106 wants to access information 108 owned by issuer B 102, it must sign its request 110 and append the Mandate 104 to its request 110 to the information source. The access control component 112 of the Service Provider 114 receives the request 110 and mandate 104. If beneficiary A 106 passes the identity validation test (whatever specified in the Mandate 104) then beneficiary A 106 is granted the specified rights under the specified usage policies.

A single Mandate may be valid for multiple Service Providers 116 or it may be necessary to issue as many Mandates as Service Providers. For instance, issuer B 102 could define an access policy for its family in each of the Service Providers and give a Mandate to each of its family members validating the fact that they are family members. So with one Mandate, access is controlled in four different service providers. Issuer B 102 also could give a specific Mandate to a person to grant it particular access rights to a Service Provider.

A mandate can be built using diverse technologies such as S/MIME (RFC2634), XML or Attribute Certificates. In accordance with one specific embodiment of the present invention, the following is an example of a pseudo XML format used to implement the Mandate:

```
<Mandate version="1.0" copyright="Versada Networks Inc.">
    <Issuer>
        <Issuer-Reference value="----------------" />
        <Issuer-Signature algorithm="X.509" value="-------------
        ---" />
    </Issuer>
    <Beneficiary-Certificate>
            <Method="X.509" />
            <Certificate="----------------" />
            <Signature algorithm="X.509" value="---------------
        ---" />
    </Beneficiary-Certificate>
    <Object>
        <target service-reference="--------------------------"
        />
        <grant allowed-rights="--------------------------" />
    </Object>
    <Usage>
        <Validity date="01-10-2010" />
    </Usage>
</Mandate>
```

The Issuer-Signature and Beneficiary-Certificate could be derived from X.509 conformant signatures or based on any XML digital signature format (RFC 3035).

The Object can be application specific or based on credential descriptions coming from initiatives such as S2ML.

The Mandate is to be used in a Mandate Infrastructure built upon XML, PKI, digital certificates and digital signature. The Mandate is first specified and then the Mandate Infrastructure is explained.

Figure 2:
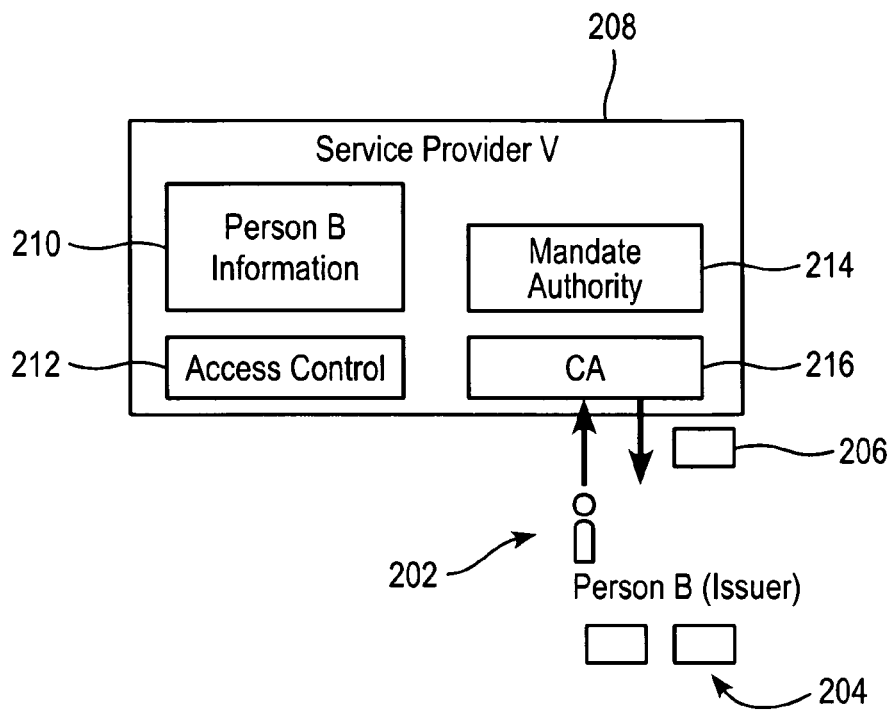
FIG. 2 is a block diagram illustrating a process prior to issuance of a mandate in accordance with one specific embodiment of the present invention.

FIG. 2 illustrates a process prior to issuance of a mandate in accordance with one specific embodiment of the present invention. Prior to issuance of any Mandate, the Issuer 202 must generate a private/public key pair 204 and obtain a public key certificate 206 from the Service Provider 208. The Service Provider 208 includes the Issuer 202's information 210, an access control 212, a mandate authority 214, and the Service Provider 208's Certificate of Authenticity (CA) 216. The access control 212 and the mandate authority 214 are described in further detail below. By exchanging public keys, the Service Provider 208 and the Issuer 202 establish the following trust paths:

Issuer 202 trusts Service Provider 208 and Issuer's own Virtual Certificate of Authenticity (VCA)

Service Provider 208 trusts Issuer 202's VCA hosted by the Mandate Authority 214.

Figure 3:
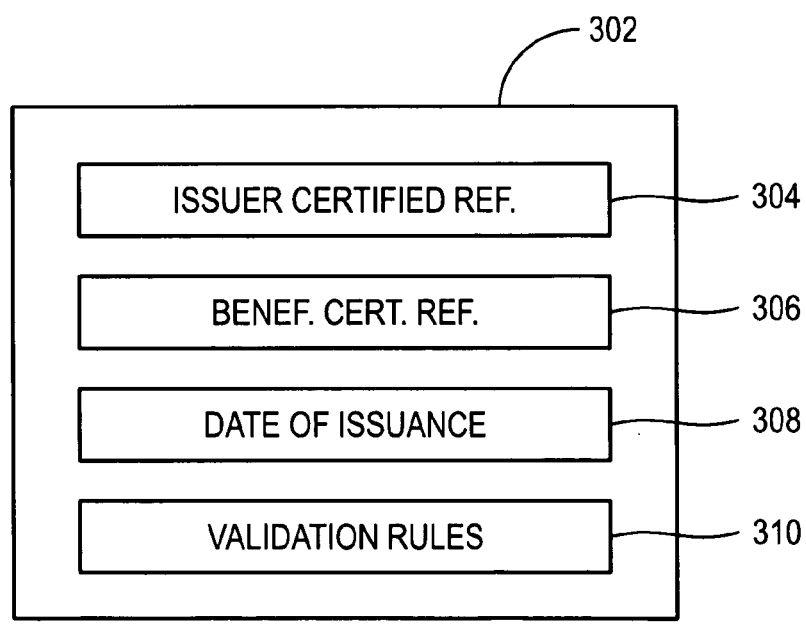
FIG. 3 is a block diagram illustrating a mandate in accordance with one specific embodiment of the present invention.

FIG. 3 illustrates the content of a Mandate in accordance with one specific embodiment of the present invention. The Mandate 302 contains, but is not limited to the following: an issuer certified reference 304, a beneficiary certified reference 306, the date of issuance 308, and general validation rules 310.

The issuer certified reference 304 is not meant to have global significance, as it is embedded in a structure that allows trust of the value. It is assumed that the issuer's company, telecommunication service provider, or public authority has created this issuer certified reference. A typical user reference is a combination of user name or customer account number and Public Key Certificate. Other technologies, like Attribute Certificate or XML signed document, can be used.

The beneficiary certified reference 306 is not meant to have global significance, as it is embedded in a structure that allows trust creation of the value. It is assumed that the beneficiary has created the reference and sent it to the issuer of the Mandate prior to the Mandate creation as illustrated in FIG. 2. A typical user reference is a combination of URL and Public Key Certificate but can include customer account number or any other relevant information. Other technologies, like Attribute Certificate or XML signed document, can be used.

The General Validation Rules 310 allow the Mandate validity to be checked against duration, which ranges from minutes to years, days of the week (Monday-Friday only) or specific hours. The validation includes revocation status check method: either Mandate Revocation List or online verification. The online verification mode assumes the presence of a reference to a Mandate Notarization entity.

Rules can be built using any combination or the following parameters:
- Optional Location of the user (usually the Beneficiary) validation rules.
  - Geography (Country, State, Town, Street . . . )
  - Wireless operator (Home, Visited, Partner of Home . . . )
  - Location type (Company premises, Partner premises, Other Trusted . . . )
- Optional device context of the user (usually the Beneficiary) validation rules
  - Voice Only
  - Browsing capabilities (WAP, Limited, Standard)
  - Identity (Serial number, Hardware Signature)
- Optional Attribute Set. An Attribute set further specifies the policy or context in which the Mandate can be used. This attribute set is not meant to have global significance. The Mandate verifier provides the issuer with a list of authorized values for the Attribute. Attribute values can specify, without limitation, the role within the Enterprise (accountant, engineer, executive . . . ), the customer's status (standard, bronze, silver, gold) and security policies (read-only . . . ).

The integrity of the Mandate is protected using a digital signature mechanism. The Digital Signature implementation method will depend upon the technology selected for the Mandate format (XML, Attribute Certificate . . . ). The Mandate confidentiality can be guaranteed using an encryption mechanism.

A Mandate can be issued by any kind of device, from cellular phone to computer desktop. The Mandate can be stored in many places, in many types of storage, like disk, computer memories, Smart Card and dongle. Storing the Mandate on the issuer's device is optional and can optionally be offered by a Notarization Authority. The Notarization Authority can also be used to offer non-repudiation services for Mandates.

The issuer can revoke a Mandate at any time to prevent its use before the legitimate Mandate end-of-life. The revocation implementation method will depend upon the technology selected for the Mandate format (XML, Attribute Certificate . . . ). In the event the Mandate is to be verified by a known limited number (say one or two) of Gates, revocation can be implemented as sending a "negative" Mandate to the Gates. If the number of Gates is significant or the Gates are unknown, the revocation should be published at a Mandate Notarization entity. The Mandate must then specify an online revocation status check with a reference to the selected Mandate Notarization.

Figure 4:
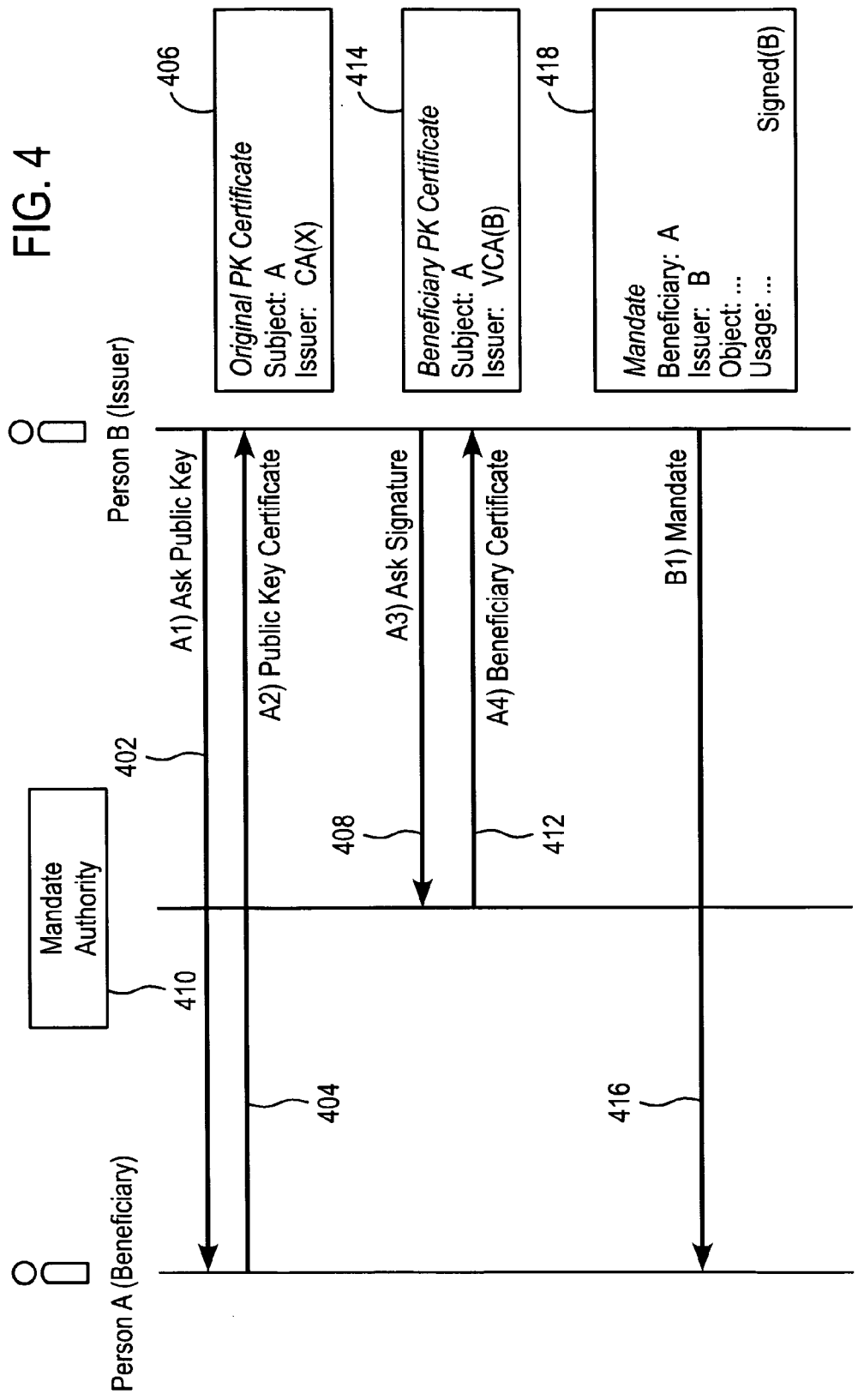
FIG. 4 is a ladder diagram illustrating a process for issuing a mandate in accordance with one specific embodiment of the present invention.

A Negative Mandate contains, but is not limited to, the following:
- Issuer Certified Reference. A user reference is not meant to have global significance, as it is embedded in a structure that allows trust of the value. It is assumed that the issuer's company; telecommunication service provider or public authority has created this issuer reference. A typical user reference is a combination of a user name or customer account number and Public Key Certificate. Other technologies, like Attribute Certificate or XML signed document, can also be used.
- Beneficiary Certified Reference. A user reference is not meant to have global significance, as it is embedded in a structure that allows trust creation of the value. It is assumed that the beneficiary has created the reference and sent it to the issuer of the Mandate prior to the Mandate creation. A typical user reference is a combination of URL and Public Key Certificate but can include customer account number or any other relevant information. Other technologies, like Attribute Certificate or XML signed document, can be used.
- Date of issuance FIG. 4 is diagram illustrates the process of issuing a mandate in accordance with one specific embodiment of the present invention. Person B (the Issuer or Grantor) wants Person A (the Beneficiary or Requestor) to access proprietary information belonging to Person A. The information resides on a computer system owned by a third party. There is a need to specify a mechanism by which the Service Provider will be able to "recognize" Person A. One option would be just to append the public key certificate from Person A. It works but this assumes a trust relationship between the Service Provider and the authority that signed Person A Public Key. This is clearly not practical. So the Mandate is based on the idea that each issuer is a sort of Virtual Certificate Authority.

FIG. 4 assumes that Person A received a public key certificate from Certificate of Authenticity CA(X).

At 402, Person B requests for Person A's public key. At 404, Person B extracts Person A's public key certificate. Therefore the original public key certificate 406 contains Person A as a subject and CA(X) as the issuer.

At 408, Person B requests a new signature from the mandate authority 410 based on the original public key certificate 406. At 412, Person B receives a beneficiary certificate based on person B's virtual CA. This process can be done only for the first time and kept in a public key store or for each mandate. Therefore the beneficiary Private Key certificate 414 contains Person A as a subject and VCA(B) as the issuer.

Finally, at 416, person B issues the mandate to person A. The mandate 418 contains person A as the beneficiary, person B as the issuer, usage privileges and settings, and signature from person B.

After the above process, Person A has two certificates for the same key pair: one coming from CA(X), one coming from VCA(B). Whenever person A wants to use information from person B using a Mandate, it can sign the document using the Private key but need to add the VCA(B) certificate.

Figure 5:
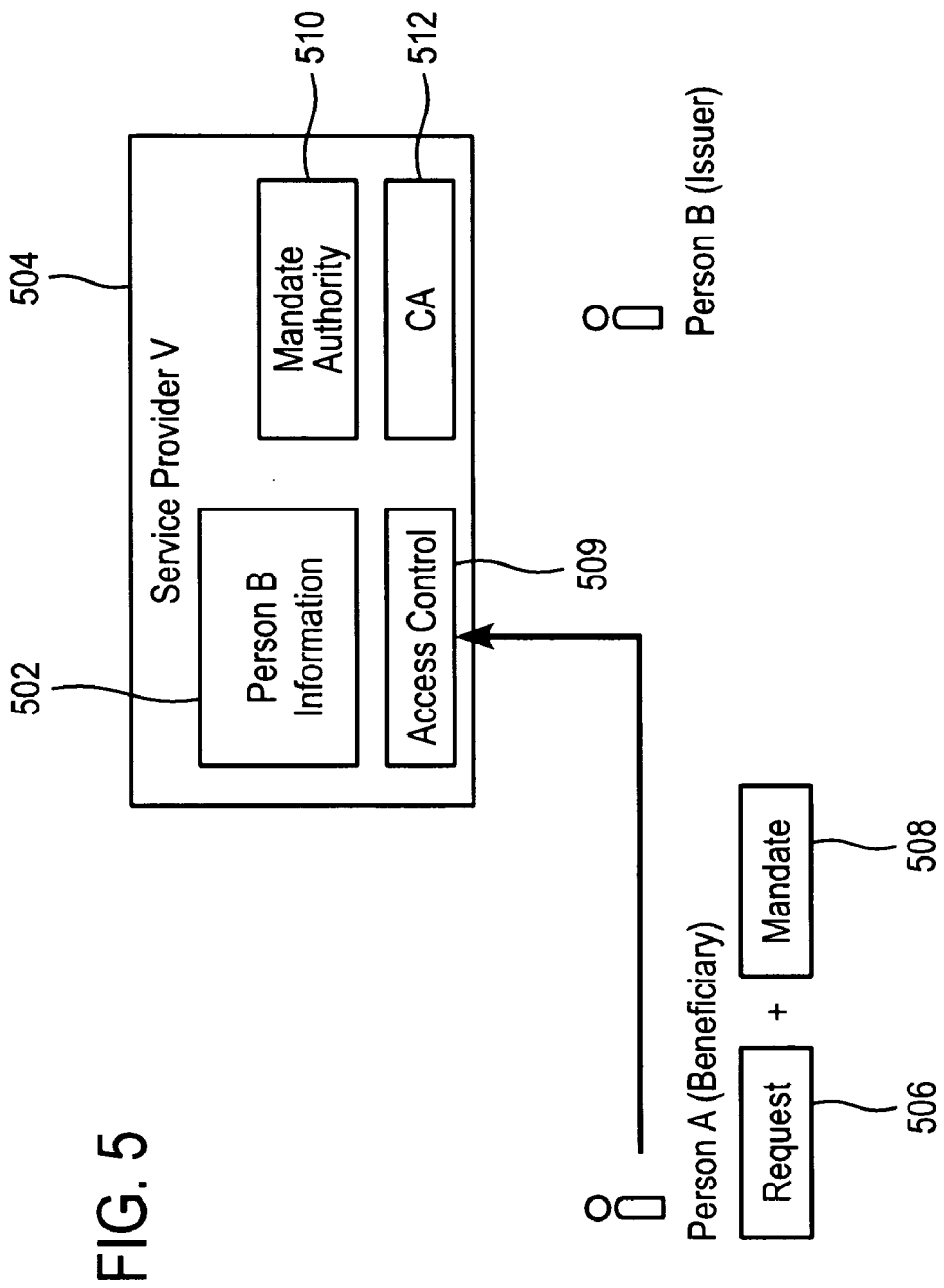
FIG. 5 is a block diagram illustrating a request for access to information in accordance with one specific embodiment of the present invention.

FIG. 5 is a diagram illustrating a request from Person A on behalf of Person B to access information 502 on Service Provider V 504 in accordance with one specific embodiment of the present invention. If Person A (beneficiary) wants to access information of Person B (issuer), a signed request 506 is created and appended to the Mandate 508 and sent to the Service Provider V 504. The service provider V 504 contains Person B information 502, an access control 509, a mandate authority 510, and a Certificate of Authenticity 512.

The signed request 506 could be built using S/MIME or XML formats. In accordance with one specific embodiment of the present invention, a pseudo XML message may look like the following:

```
<Request-Container version="1.0" copyright="Versada Networks
        Inc.">
    <Request>
        <Target Target-reference="--------------------------" />
        <Question value="--------------------------"  />
            <Requester-Signature algorithm="X.509" value="-----------
--"  />
    </Request>
    <Mandate>
        <Issuer>
            <Issuer-Reference value ="----------------"  />
            <Issuer-Signature algorithm="X.509" value="-------------
---"  />
        </Issuer>
        <Beneficiary-Certificate>
                <Method="X.509"  />
                <Certificate="-----------------"  />
                <Signature algorithm="X.509" value="---------------
---"  />
        </Beneficiary-Certificate>
        <Object grant="--------------------------"  />
        <Usage>
            <Validity date="01-10-2010"  />
        </Usage>
    </Mandate>
</ Request-Container>
```

The full specification of Mandate contains descriptions of both S/MIME and XML implementations of requests. The requester signature is generated using the Private Key corresponding to the public key certified by the Target's Virtual CA.

Figure 6:
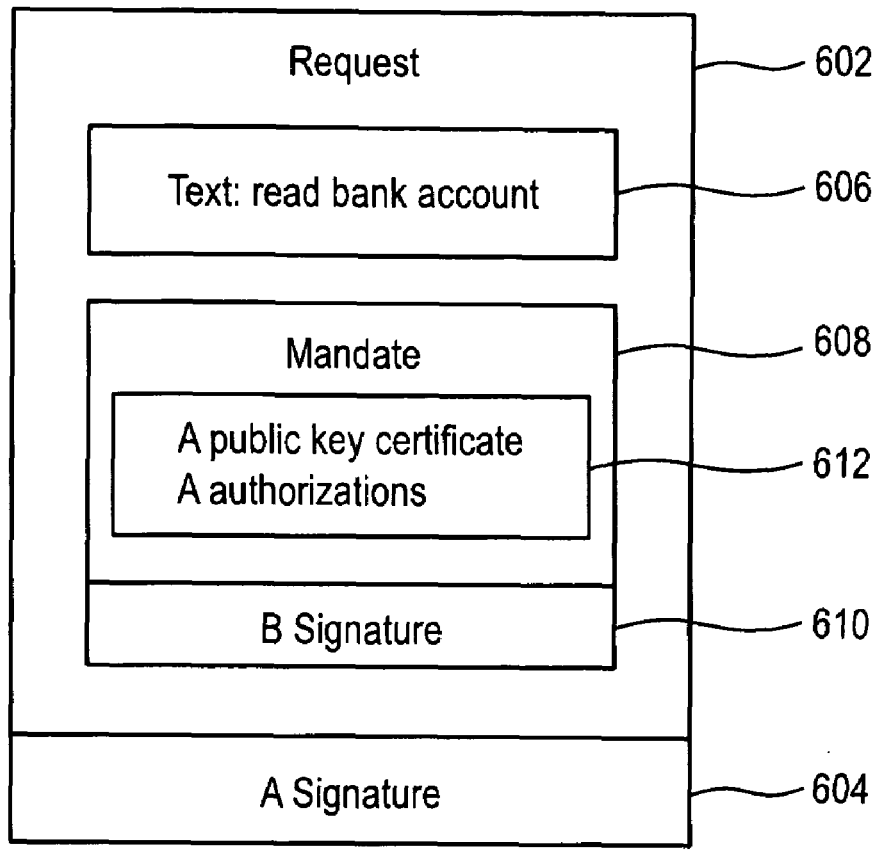
FIG. 6 is a block diagram illustrating a request in accordance with one specific embodiment of the present invention.

FIG. 6 illustrates a signed request in accordance with one specific embodiment of the present invention. A request 602 is signed with a digital signature 604 from person A (the beneficiary). The request 602 includes instructions 606 coupled to a mandate 608. The mandate 608 is signed with a digital signature 610 from person B (the issuer). As described above, the mandate 608 includes a public key certificate from A and at least one access control rule 612.

Figure 7:
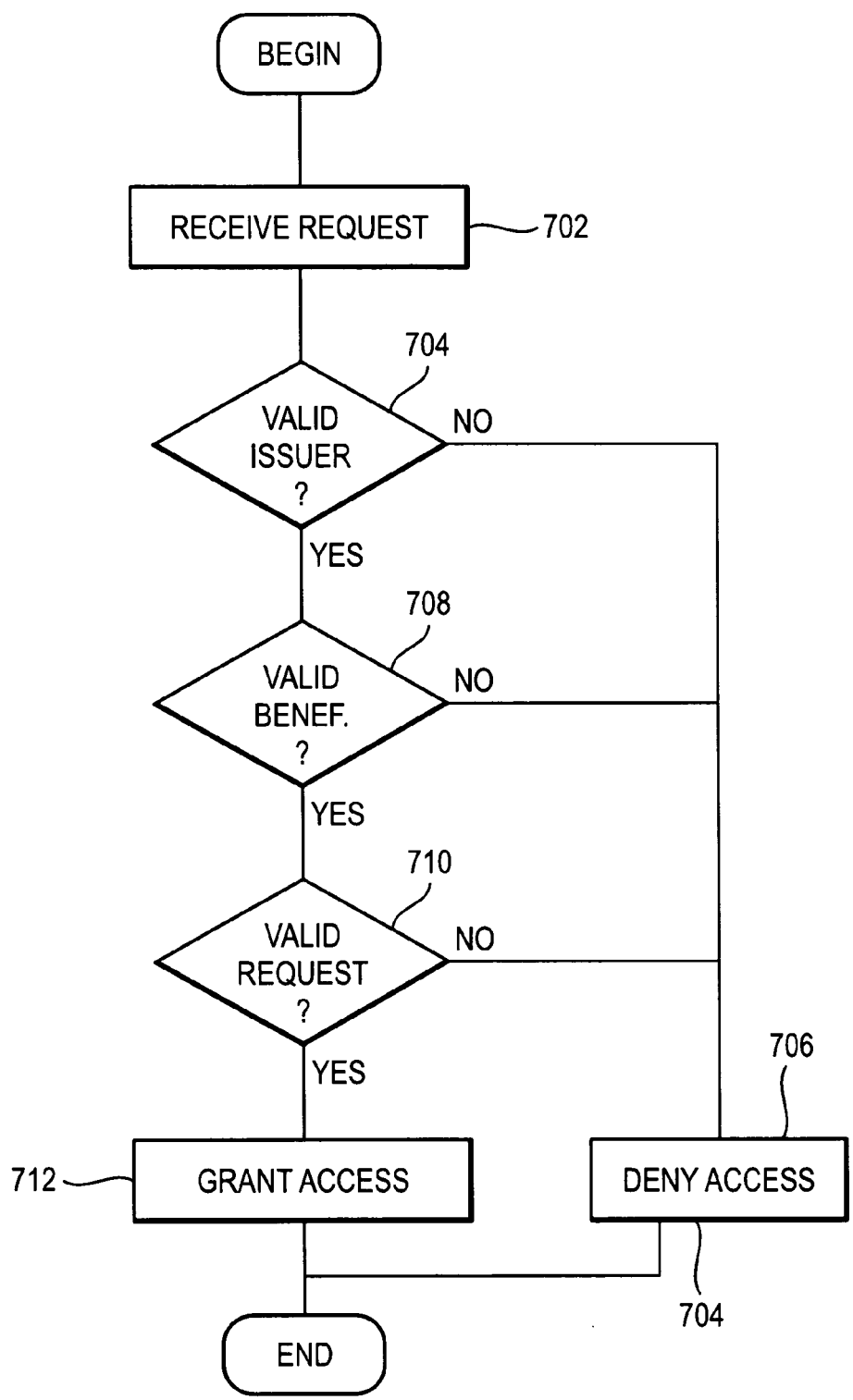
FIG. 7 is a flow diagram illustrating a method for granting access in accordance with one specific embodiment of the present invention.

FIG. 7 is a flow chart illustrating the process of an access control receiving a signed request from person A (beneficiary) seeking access to information belonging to person B (issuer) in accordance with one specific embodiment of the present invention. At 702, the access control to information on a service provider receives a request about a target person from an unknown party along with a Mandate. The Service Provider receives a request about a target person from an unknown party along with a Mandate. At 704, the process control checks to validate that the target person who issued the Mandate is a valid issuer for the specified target person. The Service Provider checks that the digital signature of the Mandate issuer corresponds to the target specified in the request. If no matching digital signature is found, the Service Provider denies access to the unknown party at 706.

If the digital signature of the Mandate issuer corresponds to the target specified in the request, the Service Provider knows that the Issuer generated the Mandate. However the Service Provider still does not know if the requester is legitimate or if the request is valid.

The Service Provider must now ensure that the requester is the one for which the Mandate has been issued. For instance, it must protect from someone who is illegitimately using a valid Mandate. In order to do so, at 708, the Service Provider checks that the request has been signed using the public key which certificate has been signed by the Issuer (Beneficiary-Certificate). If the beneficiary is not a valid one, the Service Provider denies access at 706.

At 710, the Service Provider checks whether the request from the beneficiary is valid. In accordance with one specific embodiment of the present invention, the Mandate defines two basic Usage Policies: Time validity and Online Validation.

The Time validity policy may allow, for example, a Mandate to be valid for a year or within the next 15 minutes.

The online validation policy means that the issuer must interactively validate a mandate at usage time. For instance, a mandate may be given for an entire year but each time it will be used by the beneficiary, the validation party must get a real time validation from the issuer.

Applications on the Service Provider may define specific tag including rules in any languages such as CPL. The Mandate may also introduce standard based Usage Policies as they become standardized.

If the request is found to be valid at 710, the Service Provider thus grants access at 712 based on the policy found in the Mandate.

In accordance with another specific embodiment of the present invention, the Access Control, also referred as the Gate, input parameters comprise a Mandate, an optional Request and optional Context. The optional Request is either a request to access a service (login) or a request to access information. If omitted, the gate will assume the request to be a service access request. The optional Context is built between the requestor (general information), the network provider that carried the request (certified location) and the device of the requestor (CPU serial number).

The Gate checks the vector {RequestorID, Mandate, Request, Context} against policies in order to validate the request. Policies can be defined for all mandates or for specific issuers. If successful, the Gate retrieves the ID and Role on which the request should be executed, and passes to the Gate "client" the following request vector (ID, Role, Mandate, Request, Context). Interface between "client" and Gate is highly implementation dependent. Future multiple standard interfaces with Web Servers and Web Single Sign-on products may be also implemented with the present invention.

The Gate may also receive "Negative" Mandates and store them in a Mandate Revocation List. The gate should consider void all Mandates for a beneficiary that has been issued prior to the Negative Mandate issuance date.

Figure 8:
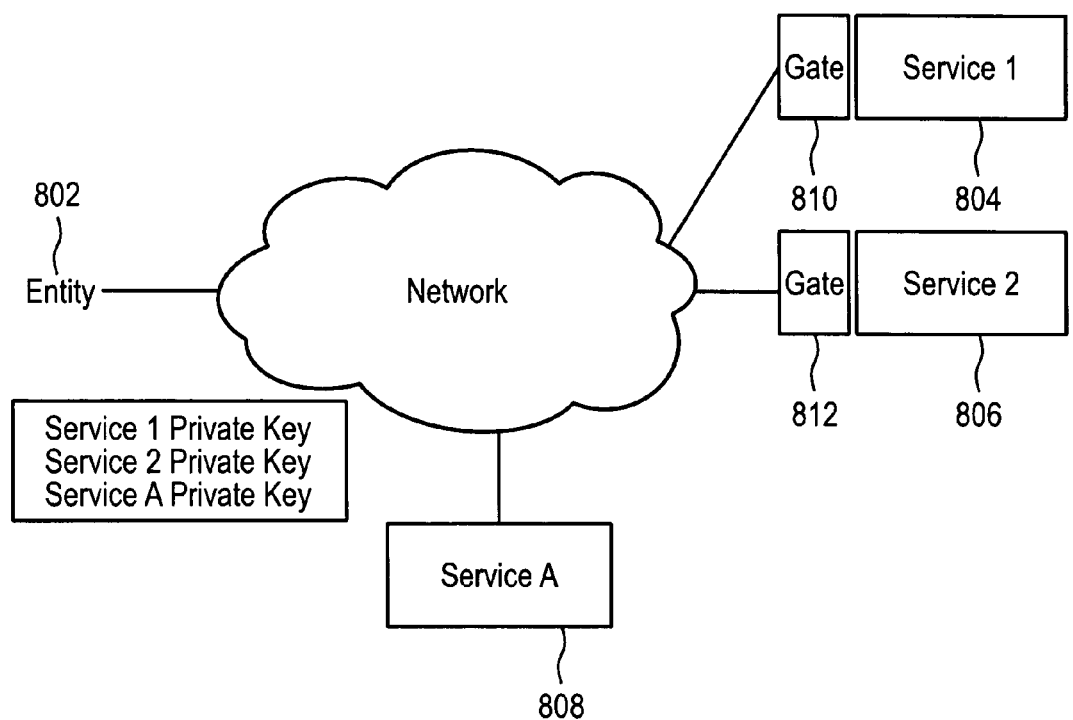
FIG. 8 is a block diagram illustrating a content aggregation scenario in accordance with one specific embodiment of the present invention.

The following scenarios are provided for sake of clarity, and do not limit the filed of applications for the Mandate and Gate concepts. FIG. 8 is a diagram illustrating an example of a scenario using the present invention in accordance with one specific embodiment of the present invention. In the context of content aggregation, a person or entity 802 has subscribed for a service in both Service Provider 1 804 and Service Provider 2 806. The person 802 wants Service A 808 to present an aggregated vision of information available from the two services 804 and 806. Service 1 804 and Service 2 806 have created a X.509 key pair and sent a Private Key along with a Public Key Certificate to the person 802. Service 1 804 and Service 2 806 have their own independent Certificate of Authority.

The person now receives a Private Key and a Public Key Certificate from Service A and creates two Mandates:

Mandate 1, signed it with the Private Key obtained from "Service 1" 804:
   Issuer: includes reference obtained from "Service 1" 804
   Beneficiary: "Service A" 808 ID
   Time Validation rules: none
   Attribute:
     Target: Service 1 URL
     Role: Read Only Mandate 2, signed it with the Private Key obtained from "Service 2" 806:
   Issuer: includes reference obtained from "Service 2" 806
   Beneficiary: "Service A" 808 ID
   Time Validation rules: none
   Attribute:
     Target: Service 1 URL
     Role: Read Only The person 802 then sends the two mandates to "Service A" 808 so that it can read, and only read, information from both services 804 and 808 through their respective gates 810 and 812. When appropriate "Service A" sends {"Service A" ID, Mandate1, getaccountstatus,} to "Service 1" 804 and {"Service A" ID, Mandate2, getaccountstatus,} to "Service 2" 806.

"Service 1" 804 validates the request:
   By validating the Mandate's digital signature→this is a Mandate issued by "person", which is a customer whose ID is Person ID1.
   By validating the Beneficiary's digital signature: this compares "Service A's" ID given in the request vector and the beneficiary reference.
   By validating time rules and other optional rules.

"Service 1" 804 then passes {personID1, Read Only, Mandate1, getaccountstatus,} to the web application. "Service 1" 804 can track activity of the person, but also know that the requestor is not the owner of the service. It is up to "Service 1" 804 to create role definitions that allow their customers to assign privileges. For instance, a Bank might find it useful to create roles for "read only", "transfer with limited amount" or "transfer from a selected list of accounts".

In the context of a wireless operator, the Mandate and the Gate give the means to a Wireless Operator to offer differentiated services to Corporations, such as; specific rate plans and rate plan management (multiple rate plans—limited roaming, heavy roaming) and access to Gold Services, even if each employee does not reach the Gold status based on its air time.

The Wireless Operator and the Corporation first establishes a trusted relationship (for example, between Certificate Authorities if PKI is used). The Wireless Operator issues a Mandate to the Corporation that allows employees to self subscribe and to access services. The Mandate can be issued for a specific type of employee or it can specify a context of use like under weekdays only. A Gate located at the Wireless Operator validates the mandate along with the employee identity and credentials. If the Corporation revoke the employee identity, then the employee (or former employee) cannot use the Mandate anymore.

Attribute Certificates can be used as an alternative to Mandate and Gate for a limited subset of situation but does not address the contextual access policies. Furthermore, the Mandate and Gate combination can be used to implement roaming agreements where a need for credential translation exists. For instance, Gold customers may have access to Silver services when roaming to a wireless operator or no service at all in other situations.

Figure 9:
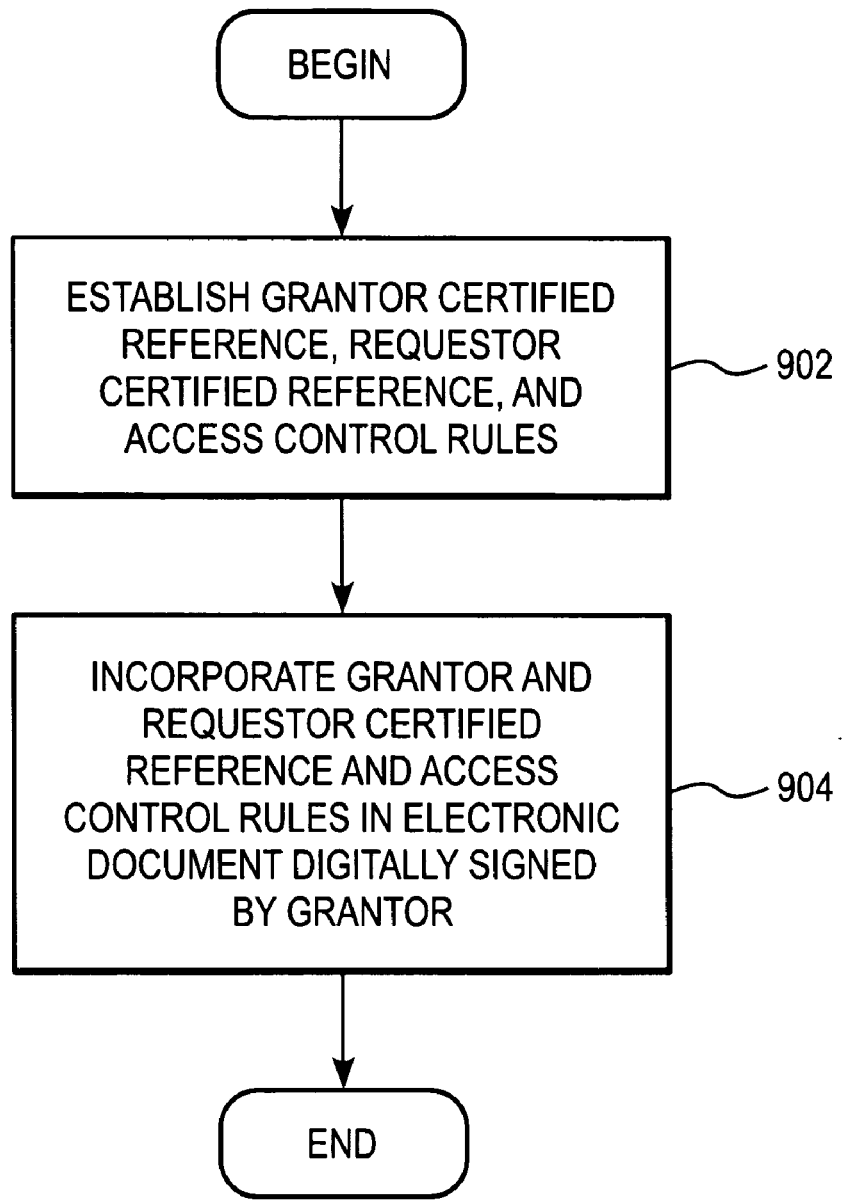
FIG. 9 is a flow diagram illustrating a method for issuing an electronic document in accordance with one specific embodiment of the present invention.

FIG. 9 is a flow diagram illustrating a method for issuing an electronic document in accordance with one specific embodiment of the present invention. A grantor grants specified access to information stored in a computer system owned by another party to the requestor. At 902, a grantor certified reference, a requestor certified reference, and access control rules for the requestor are established. The grantor certified reference may include, for example, a name and password combination or a digital certificate. The requestor certified reference may include, for example, a name and password combination or a digital certificate. The access control rules may be expressed, for example, in hypertext language, or in extensible mark-up language (XML).

At 904, the grantor certified reference, requestor certified reference, and access control rules are incorporated in the electronic document that is digitally signed by the grantor.

Figure 10:
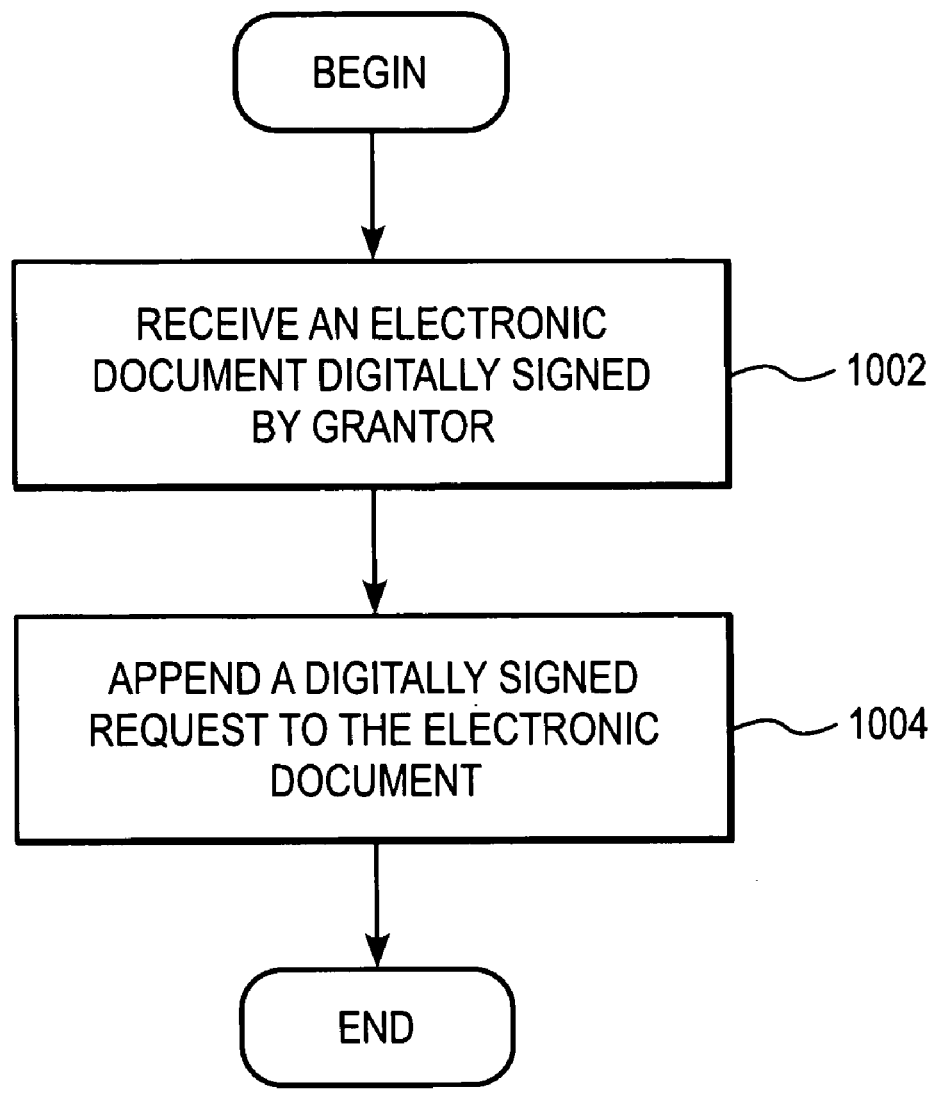
FIG. 10 is a flow diagram illustrating a method for accessing information or application in accordance with one specific embodiment of the present invention.

FIG. 10 is a flow diagram illustrating a method for accessing information in accordance with one specific embodiment of the present invention. At 1002, an entity or person, the requestor, seeking to access information on behalf of a grantor on a computer system on a third party receives an electronic document digitally signed by a grantor. The electronic document may include a grantor certified reference, a requestor certified reference, and access control rules for the requestor. The grantor certified reference may include, for example, a name and password combination or a digital certificate. The requestor certified reference may include, for example, a name and password combination or a digital certificate. The access control rules may be expressed, for example, in hypertext language, or in extensible mark-up language (XML).

At 1004, a digitally signed request for access to the information is appended to the electronic document by the requestor. In accordance with one specific embodiment of the present invention, the request may be expressed in hypertext language, or in extensible mark-up language (XML), or in a structured query language.

Figure 11:
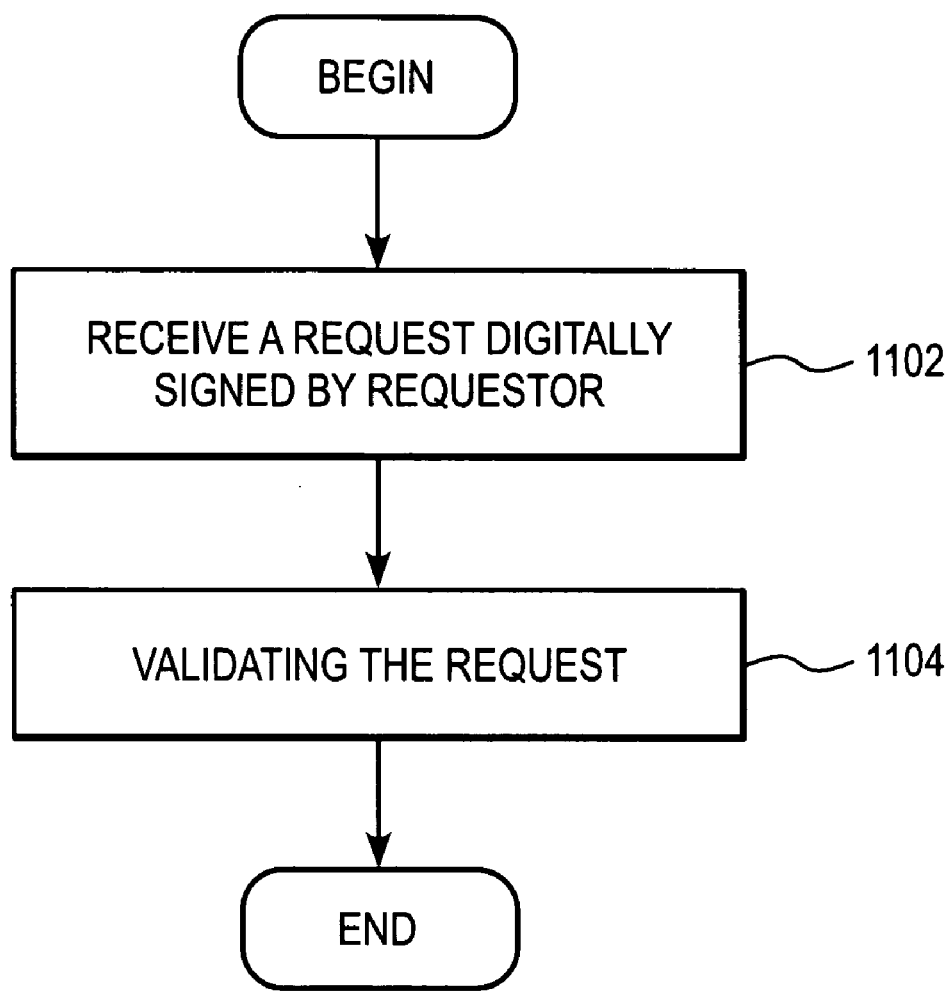
FIG. 11 is a flow diagram illustrating a method for validating access to information or application in accordance with one specific embodiment of the present invention.

FIG. 11 is a flow diagram illustrating a method for validating access to information in accordance with one specific embodiment of the present invention. A grantor grants access to information stored in a computer system owned by the third party to a requestor. At 1102, a request digitally signed by a requestor is received. The digitally signed request has an electronic document digitally signed by a grantor. In accordance with one specific embodiment of the present invention, the electronic document may include a grantor certified reference, a requestor certified reference, access control rules for the requestor.

The grantor certified reference may include, for example, a name and password combination or a digital certificate. The requestor certified reference may include, for example, a name and password combination or a digital certificate. The access control rules may be expressed, for example, in hypertext language, or in extensible mark-up language (XML).

At 1104, the request is validated using the requestor certified reference and the access control rules for the requestor.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for issuing an electronic document comprising:
   establishing a grantor certified reference by a grantor, a requestor certified reference, and access control rules for a requestor, said grantor owning information that is to be accessed by said requestor;
   incorporating, by a processor device, said grantor certified reference, said requestor certified reference, and said access control rules in an electronic document digitally signed by said grantor;
   providing the signed electronic document to a service provider that stores the information on a computer system and that controls access to the information;
   determining that the grantor is valid based on the signature of the grantor;
   determining that the requestor is valid based on the requestor certified reference; and
   providing the requestor with access to the information stored on the computer system based on the determination that the grantor is valid and the determination that the requestor is valid.

2. The method according to claim 1 wherein said grantor certified reference includes a name and password combination.

3. The method according to claim 1 wherein said requestor certified reference includes a name and password combination.

4. The method according to claim 1 wherein said grantor certified reference includes a digital certificate.

5. The method according to claim 1 wherein said requestor certified reference includes a digital certificate.

6. The method according to claim 1 wherein said access rule is expressed in hypertext language.

7. The method according to claim 1 wherein said access rule is expressed in extensible mark-up language (XML).

8. A method for accessing information comprising:
   receiving an electronic document digitally signed by a grantor, said electronic document having a grantor certified reference, a requestor certified reference of a requestor seeking access to grantor's information stored on a computer owned by a service provider, and access control rules for said requestor;
   appending, by a processor device, a digitally signed request for access to the information to said electronic document by said requestor; and
   allowing the requestor to access the grantor's information on the service provider's computer based on whether the signature of the grantor corresponds to information specified in the request, and based on whether the digital signature of the request corresponds to the certificate of said requestor certified reference.

9. The method according to claim 8 wherein said grantor certified reference includes a name and password combination.

10. The method according to claim 8 wherein said requestor certified reference includes a name and password combination.

11. The method according to claim 8 wherein said grantor certified reference includes a digital certificate.

12. The method according to claim 8 wherein said requestor certified reference includes a digital certificate.

13. The method according to claim 8 wherein said access rule is expressed in hypertext language.

14. The method according to claim 8 wherein said access rule is expressed in extensible mark-up language (XML).

15. The method according to claim 8 wherein said request is expressed in hypertext language.

16. The method according to claim 8 wherein said request is expressed in extensible mark-up language (XML).

17. The method according to claim 8 wherein said request is expressed in structured query language.

18. A method for validating access to information comprising:
   receiving a request digitally signed by a requestor, said digitally signed request having an electronic document digitally signed by a grantor, who owns information that is stored on a third party computer, said electronic document having a grantor certified reference, a requestor certified reference, and access control rules for said requestor, wherein said requestor seeks to access the information;
   validating, by a processor device, said request based on whether the signature of the grantor corresponds to information specified in the request, based on whether the digital signature of the request corresponds to the certification of said requestor certified reference, and based on said access control rules for said requestor; and
   allowing the requestor to access the information.

19. The method according to claim 18 wherein said grantor certified reference includes a name and password combination.

20. The method according to claim 18 wherein said requestor certified reference includes a name and password combination.

21. The method according to claim 18 wherein said grantor certified reference includes a digital certificate.

22. The method according to claim 18 wherein said requestor certified reference includes a digital certificate.

23. The method according to claim 18 wherein said access rule is expressed in hypertext language.

24. The method according to claim 18 wherein said access rule is expressed in extensible mark-up language (XML).

25. The method according to claim 18 wherein said request is expressed in hypertext language.

26. The method according to claim 18 wherein said request is expressed in extensible mark-up language (XML).

27. The method according to claim 18 wherein said request is expressed in structured query language.

28. The method according to claim 18, further comprising: validating said electronic document using said grantor certified reference.

29. A method for validating access to information comprising:
providing an electronic document having a requestor certified reference, a grantor certified reference, at least one access rule digitally signed by a grantor, and a request digitally signed by a requestor, wherein said grantor owns information stored on a third party computer;
validating, by a processor device, said electronic document based on whether the signature of the grantor corresponds to information specified in the request, based on whether the digital signature of the request corresponds to the certification of said requestor certified reference, and based on and said at least one access rule; and
allowing said requestor access to said information.

30. A method for validating access to information of a grantor comprising:
providing an electronic document which contains means to check the identity of a requestor, at least one access rule digitally signed by a grantor, and a request digitally signed by said requestor, wherein said requestor seeks to access information owned by said grantor and stored on a third party computer;
validating, by a processor device, said request based on whether the signature of the grantor corresponds to information specified in the request, based on whether the digital signature of the request corresponds to the certification of the requestor certified reference, and based on said access rules and
allowing the requestor to access said information.

31. An apparatus for issuing an electronic document of a grantor, said apparatus comprising:
means for establishing a grantor certified reference, a requestor certified reference, and access control rules for a requestor device, wherein a grantor owns information that is to be accessed by said requestor device;
means for incorporating said grantor certified reference, said requestor certified reference, and said access control rules in an electronic document digitally signed by a grantor device; and
means for providing the signed electronic document to a service provider that stores the information on a computer system, and controls access to said the information;
means for determining that the grantor device is valid based on the signature of the grantor device;
means for determining that the requestor device is valid based on the requestor certified reference; and
means for providing the requestor device with access to the information on the computer based on the determination that the grantor device is valid and the determination that the requestor device is valid.

32. An apparatus for accessing information of a grantor comprising:
means for receiving an electronic document digitally signed by a grantor device, said electronic document having a grantor certified reference, a requestor certified reference of a requestor device seeking access to information of the grantor device stored on a computer owned by a service provider, and access control rules for said requestor device; and
means for appending a digitally signed request for access to the information to said electronic document by said requestor device, and
means for allowing the requestor device to access the information of the grantor on the service provider's computer based on whether the signature of the grantor device corresponds to information specified in the request, and based on whether the digital signature of the request corresponds to the certificate of said requestor certified reference.

33. An apparatus for validating access to information of a grantor, said apparatus comprising:
means for receiving a request digitally signed by a requestor device, said digitally signed request having an electronic document digitally signed by a grantor device, said electronic document having a grantor certified reference, a requestor certified reference, access control rules for said requestor device, wherein the requestor device is seeking access to information owned by the grantor, the information being stored on a computer owned by a third party;
means for validating said request device based on whether the signature of the grantor device corresponds to information specified in the request, based on whether the digital signature of the request corresponds to the certification of said requestor certified reference, and based on said access control rules for said requestor device; and
means for allowing the requestor device to access the information.

34. An apparatus for validating access to information of a grantor, said apparatus comprising:
means for providing an electronic document having a requestor certified reference, a grantor certified reference, at least one access rule digitally signed by a grantor device, and a request digitally signed by a requestor device, wherein said grantor device owns information stored on a third party computer;
means for validating said electronic document based on whether the signature of the grantor device corresponds to information specified in the request, based on whether the digital signature of the request corresponds to the certification of said requestor certified reference, and based on and said at least one access rule; and
means for allowing the requestor device to access said information.

35. An apparatus for validating access to information of a grantor, said apparatus comprising:
means for providing an electronic document which contains means to check the identity of a requestor device, at least one access rule digitally signed by a grantor device, and a request digitally signed by said requestor device, wherein said requestor device seeks to access information owned by said grantor and stored on a third party computer; and means for validating said request based on whether the signature of the grantor device corresponds to information specified in the request, based on whether the digital signature of the request corresponds to the certification of said requestor certified reference, and based on said access rules; and means for allowing the requestor device to access said information.

36. A computer-readable program storage device storing program instructions that, when executed by a processor, control a computer to perform a method for issuing an electronic document, the method comprising:

establishing a grantor certified reference, a requestor certified reference, and access control rules for said requestor device, said grantor device owning information that is to be accessed by said requestor device;

incorporating said grantor certified reference, said requestor certified reference, and said access control rules in an electronic document digitally signed by said grantor device, providing the signed electronic document to a service provider that stores a grantor's information on a computer system, and controls access to said grantor's information;

determining that the grantor device is valid based on the signature of the grantor device;

determining that the requestor device is valid based on the requestor certified reference; and providing, by said service provider, access to said grantor's information to said requestor device based on said determination that the grantor device is valid and said determination that the requestor device is valid.

37. A computer-readable program storage device storing program instructions that, when executed by a processor, control a computer to perform a method for access information, the method comprising:

receiving an electronic document digitally signed by a grantor device, said electronic document having a grantor certified reference, a requestor certified reference of a requestor device seeking access to the grantor's information stored on a computer owned by a service provider, and access control rules for said requestor device;

appending a digitally signed request for access to the information to said electronic document by said requestor device; and allowing the requestor device to access the grantor's information on the service provider's computer based on whether the signature of the grantor device corresponds to information specified in the request, and based on whether the digital signature of the request corresponds to the certificate of said requestor certified reference.

38. A computer-readable program storage device storing program instructions that, when executed by a processor, control a computer to perform a method for validating access to information, the method comprising:

receiving a request digitally signed by a requestor device, said digitally signed request having an electronic document digitally signed by a grantor device, who owns information that is stored on a third party computer, said electronic document having a grantor certified reference, a requestor certified reference, access control rules for said requestor, wherein said requestor device seeks to access the information;

validating said request based on whether the certification of the signature of the grantor device corresponds to information specified in the request, based on whether the digital signature of the request corresponds to the certification of said requestor certified reference, and based on said access control rules for said requestor device; and allowing the requestor device to access the information.

39. A computer-readable program storage device storing program instructions that, when executed by a processor, control a computer to perform a method for validating access to information, the method comprising:

providing an electronic document having a requestor certified reference, a grantor certified reference, at least one access rule digitally signed by a grantor device, and a request digitally signed by said requestor device, wherein said grantor device owns information stored on a third party computer;

validating said electronic document based on whether the signature of the grantor device corresponds to information specified in the request, based on whether the digital signature of the request corresponds to the certification of said requestor certified reference, and based on said grantor certified reference and said at least one access rule; and allowing said requestor device access to said information.

40. A computer-readable program storage device storing program instructions that, when executed by a processor, control a computer to perform a method for validating access to information, the method comprising:

providing an electronic document which contains means to check the identity of a requestor device, at least one access rule digitally signed by a grantor device, and a request digitally signed by said requestor device, wherein said requestor device seeks to access information owned by said grantor and stored on a third party computer;

validating said request based on whether the signature of the grantor device corresponds to information specified in the request, based on whether the digital signature of the request corresponds to the certification of said requestor certified reference, and based on said access rules; and allowing the requestor to access said information.

41. An apparatus for granting access to information of a grantor, said apparatus comprising:

means for appending a digitally signed request for access to information, the information owned by the grantor and stored on a third party computer system, to an electronic document by a requestor device, wherein the electronic document has a grantor certified reference, a requestor certified reference, and access control rules for said requestor device, and is digitally signed by the grantor device;

means for validating the digitally signed request; and means for granting access to the information to the requestor device based on whether the signature of the grantor device corresponds to information specified in the request, and based on whether the digital signature of the request corresponds to the certification of said requestor certified reference.

42. A method for issuing an electronic document comprising:

establishing a grantor certified reference by a grantor, a requestor certified reference, and access control rules for a requestor that are appended to an electronic document that is digitally signed by the grantor, the grantor owning information that is to be accessed by the requestor;

providing the signed electronic document to a service provider storing the information on a computer system and controlling access to the information; and allowing, by a processor device, the requestor to access the information stored on the computer system based on whether the signature of the grantor is valid for the grantor's information, and based on whether the requestor certified reference is valid for the requestor.

43. A method for validating an electronic document comprising:

receiving a electronic document digitally signed by a grantor, the electronic document having appended thereto a grantor certified reference, a requestor certified reference, and access control rules for a requestor to information owned by the grantor;

reviewing the electronic document and appended grantor certified reference, a requestor certified reference, and access control rules for a requestor; and granting, by a processor device, the requestor access to the information, which is stored on a third party computer system, based on whether the signature of the grantor corresponds to the information, and based on whether the requestor corresponds to the requestor certified reference.

44. The method of claim 43, wherein the electronic document is digitally signed by the requestor and the grantor.

* * * * *

UNITED STATES PATENT AND TRADEMARK OFFICE
CERTIFICATE OF CORRECTION

PATENT NO. : 7,657,747 B2 Page 1 of 1
APPLICATION NO. : 10/173204
DATED : February 2, 2010
INVENTOR(S) : Ozog et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this

Thirtieth Day of November, 2010

David J. Kappos
*Director of the United States Patent and Trademark Office*